Feb. 9, 1960

L. HILL 2,924,402

BRAKE WING FOR AIRCRAFT

Filed April 24, 1957

INVENTOR.
LOUIS HILL
BY
Carl Miller
ATTORNEY

United States Patent Office 2,924,402
Patented Feb. 9, 1960

2,924,402

BRAKE WING FOR AIRCRAFT

Louis Hill, New York, N.Y.

Application April 24, 1957, Serial No. 654,878

3 Claims. (Cl. 244—113)

This invention relates to aircraft and, more particularly, to an auxiliary flight control wing therefor.

Ordinarily, high speed aircraft require substantially long landing strips, must be landed at dangerously high speeds, and require unusually long approaches for landing and take off. It is an object of the present invention therefore to provide an auxiliary wing structure for airplanes that may be controlled independently of the flight wing assembly for reducing the speed of the aeroplane in flight and providing additional lift for landings and take offs.

It is another object of the present invention to provide an auxiliary brake wing for aeroplanes that is simple in construction, efficient in operation, and which will overcome the aforementioned difficulties.

All of the foregoing and still further objects and advantages of this invention will become apparent from a study of the following specification, taken in connection with the accompanying drawing, wherein.

Figure 1:
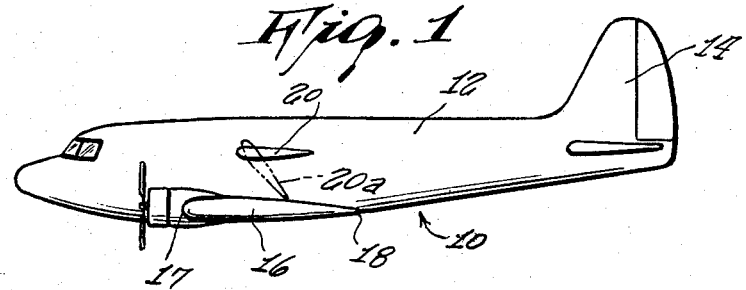
Figure 1 is a side elevational view of an aeroplane embodying a brake wing assembly made in accordance with the present invention.
Figure 2:
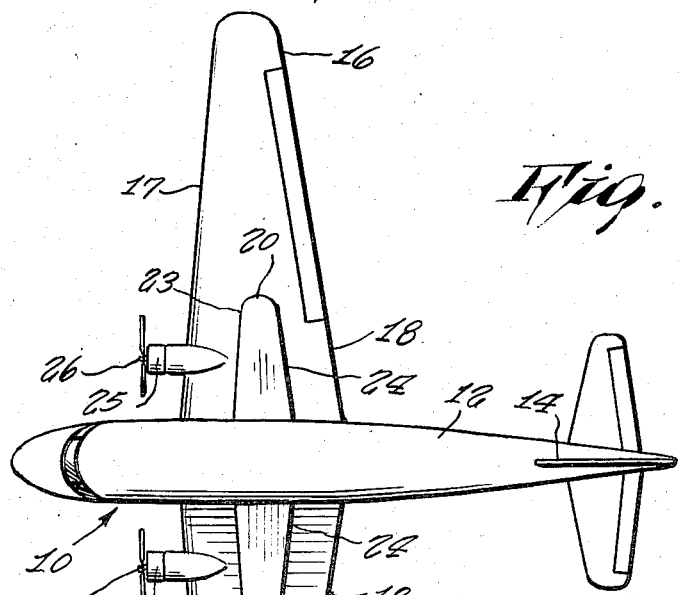
Figure 2 is a top plan view of the aeroplane shown in Figure 1.
Figure 3:
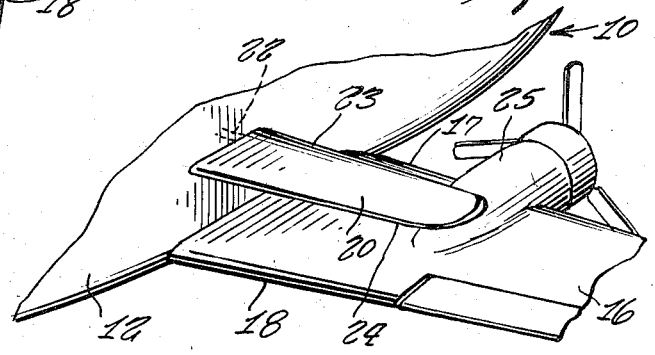
Figure 3 is a fragmentary perspective view of the brake wing construction shown in Figures 1 and 2.

Referring now to the drawing, an aeroplane 10 is shown to include a brake wing assembly 20 made in accordance with the present invention. This aeroplane 10 is provided with a fuselage 12, a tail assembly 14, and a flight wing assembly 16. Each side of the flight wing 16 is provided with a leading edge 17 and a trailing edge 18, upon which internal combustion engines 25 are mounted.

The brake wing 20 is also provided with a leading edge 23 and a trailing edge 24 and is of substantially identical configuration as the flight wing assembly 16, but is of substantially smaller size. It will be noted that the longitudinal axis of the brake wing assembly 20 is directly above the longitudinal axis of the flight wing assembly 16, whereby the leading edge 23 of the brake wing is spaced a distance from the leading edge 17 of the flight wing that is approximately equal to the distance between the trailing edge 24 of the brake wing and the trailing edge 18 of the flight wing. Furthermore, each side of the brake wing 20 extends toward the tips of the flight wing 16, beyond the longitudinal axis of the motor shafts 26.

A control shaft 22 is secured to each of the brake wings 20 forwardly of the central longitudinal axis thereof. Thus, upon rotation of the control shaft 22, the brake wing 20 can be rotated from a normally parallel position relative to the flight wing 16 to an inclined position 20a, in which inclined position it is operative to retard the flight of the aeroplane 10 and reduce the speed thereof. Of course, the additional wing surface provided by the brake wing 20 increases the lift of the aircraft, by reducing the minimum landing speed and take off speed of the aeroplane, whereby safer landings in shorter spaces is possible.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An aeroplane including the combination of a fuselage, a flight wing assembly comprising a pair of opposite flight wings or airfoils extending from the sides of the fuselage below the upper portion thereof, a tail assembly connected to said fuselage to co-operate with the wing assembly for sustaining said fuselage in flight, and brake means for controlling the flight of the aeroplane comprising a pair of relatively smaller wings or airfoils mounted on the sides of said fuselage a predetermined short distance above and in symmetry with the first mentioned flight wings or airfoils and directly above the latter in effective positions to be tilted downwards rearwardly to the flight wings beneath, said relatively smaller wings being mounted for limited rotation about a horizontal axis adjacent the forward portions thereof and contained within said wings, and means for mounting said smaller wings for such limited rotation including a longitudinal shaft rotatable upon said fuselage and supporting said smaller wings with the axis thereof within the leading edge of the latter wings.

2. In an aeroplane as set forth in claim 1, further comprising motors having propeller drive shafts, said motors being supported upon said flight wing assembly intermediate the ends thereof and adjacent to the leading edge thereof, and said smaller wings extending from said fuselage beyond the longitudinal axes of said drive shafts toward the ends of said flight wing assembly.

3. In an aeroplane as set forth in claim 2, wherein the plane of said smaller wings is normally parallel to the plane of said flight wings, rotation of said rotatable shaft being adapted to rotate said plane of said smaller wings relative to the plane of said flight wing and out of parallelism therewith.

References Cited in the file of this patent

UNITED STATES PATENTS

| | | |
|---|---|---|
| 1,500,184 | Ellsdorf | July 8, 1924 |
| 1,873,662 | O'Malley | Aug. 23, 1932 |